(12) United States Patent
Kapadia et al.

(10) Patent No.: US 9,467,342 B2
(45) Date of Patent: Oct. 11, 2016

(54) AUTOMATIC RESOLUTION OF VIRTUAL NETWORK INSTANCE TO VLAN MAPPING CONFLICTS IN DUAL-HOMED DEPLOYMENTS IN A DYNAMIC FABRIC AUTOMATION NETWORK ARCHITECTURE

(71) Applicant: CISCO TECHNOLOGY, INC., San Jose, CA (US)

(72) Inventors: Shyam Kapadia, Santa Clara, CA (US); Rick Chang, Santee, CA (US); Yibin Yang, San Jose, CA (US); Rajesh Babu Nataraja, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 240 days.

(21) Appl. No.: 14/266,395

(22) Filed: Apr. 30, 2014

(65) Prior Publication Data
US 2015/0180722 A1    Jun. 25, 2015

Related U.S. Application Data

(63) Continuation of application No. 14/264,856, filed on Apr. 29, 2014.

(60) Provisional application No. 61/920,708, filed on Dec. 24, 2013.

(51) Int. Cl.
*H04L 12/24*     (2006.01)
*H04L 12/46*     (2006.01)
*H04L 12/931*    (2013.01)

(52) U.S. Cl.
CPC .......... *H04L 41/12* (2013.01); *H04L 12/4625* (2013.01); *H04L 12/4633* (2013.01);
(Continued)

(58) Field of Classification Search
None
See application file for complete search history.

(56) References Cited

U.S. PATENT DOCUMENTS 6,151,324 A  *  11/2000  Belser ................. H04L 12/4608
                                                    370/355
8,359,364 B2     1/2013  Bangalore et al.
(Continued)

FOREIGN PATENT DOCUMENTS

WO    WO2015/100041    7/2015
WO    WO2015/100042    7/2015

OTHER PUBLICATIONS

PCT Mar. 30, 2015 International Search Report and Written Opinion from International Application Serial No. PCT/US2014/070202.
(Continued)

*Primary Examiner* — Huy D Vu
*Assistant Examiner* — James P Duffy
(74) *Attorney, Agent, or Firm* — Patent Capital Group

(57) ABSTRACT

In accordance with one example embodiment, there is provided a system configured for virtual local area network (VLAN) blocking on a virtual port channel (vPC) member link to handle discrepant virtual network instance (VNI) to VLAN mappings. In other embodiments, the system can be configured for providing Virtual Switch Interface Discovery Protocol (VDP) and virtual switch enhancements to accommodate discrepant VNI to VLAN mappings. In another example embodiment, an apparatus is provided that includes a processor, and a memory coupled to the processor, where the apparatus is configured such that if a server is connected through a virtual port channel, a VDP is used to notify the server of different VNI to VLAN mappings. In another embodiment, the apparatus can extend a VDP Filter Info Field to carry a set of VLANs mapped to a VNI, keyed by leaf MAC addresses that serve as bridge identifiers.

18 Claims, 9 Drawing Sheets

(52) U.S. Cl.
CPC ....... *H04L12/4641* (2013.01); *H04L 41/0803* (2013.01); *H04L 41/0816* (2013.01); *H04L 41/26* (2013.01); *H04L 49/354* (2013.01)

(56) References Cited

U.S. PATENT DOCUMENTS

| | | |
|---|---|---|
| 8,612,532 B2 | 12/2013 | Bangalore et al. |
| 2011/0299534 A1 | 12/2011 | Koganti et al. |
| 2012/0063363 A1 | 3/2012 | Li et al. |
| 2013/0322453 A1* | 12/2013 | Allan .................. H04L 12/4662 370/395.53 |
| 2014/0056298 A1* | 2/2014 | Vobbilisetty ............ H04L 12/46 370/355 |
| 2015/0046572 A1 | 2/2015 | Cheng et al. |
| 2015/0071286 A1 | 3/2015 | de Silva et al. |
| 2015/0180722 A1 | 6/2015 | Kapadia et al. |

OTHER PUBLICATIONS

PCT Apr. 8, 2015 International Search Report and Written Opinion from International Application Serial No. PCT/US2014/070201.

U.S. Appl. No. 14/264,856, filed Apr. 29, 2014, entitled "Automatic Resolution of Virtual Network Instance to VLAN Mapping Conflicts in Dual-Homed Deployments in a Dynamic Fabric Automation Network Architecture," Inventor: Shyam Kapadia, et al.

Lukowski, Damian, "Virtelle Netze—Zurick zum Soft-Switch?" The Network Insider, Aug. 2012 http://www.comconsult.com/papers/2012/in1208_virtuelle.pdf [Google Translation Only Available].

* cited by examiner

… (1)

AUTOMATIC RESOLUTION OF VIRTUAL NETWORK INSTANCE TO VLAN MAPPING CONFLICTS IN DUAL-HOMED DEPLOYMENTS IN A DYNAMIC FABRIC AUTOMATION NETWORK ARCHITECTURE

CROSS-REFERENCE TO RELATED APPLICATIONS

This application claims the benefit of earlier filing date under 35 U.S.C. §119(e) to U.S. Provisional Application Ser. No. 61/920,708, entitled "AUTOMATIC RESOLUTION OF VNI TO VLAN MAPPING CONFLICTS IN DUAL-HOMED DEPLOYMENTS IN DFA ENVIRONMENTS" filed on Dec. 24, 2013, which is hereby incorporated by reference in its entirety.

This application is related to U.S. Non-Provisional application Ser. No. 14/020,791, entitled "SYSTEM AND METHOD FOR UTILIZATION OF A SEGMENTATION IDENTIFICATION TO SUPPORT TRANSMISSION OF DATA TO A DESTINATION NODE" filed on Sep. 7, 2013, which is hereby incorporated by reference in its entirety.

This application is a continuation (and claims the benefit of priority under 35 U.S.C. §120) of U.S. application Ser. No. 14/264,856, filed Apr. 29, 2014, entitled "AUTOMATIC RESOLUTION OF VIRTUAL NETWORK INSTANCE TO VLAN MAPPING CONFLICTS IN DUAL-HOMED DEPLOYMENTS IN A DYNAMIC FABRIC AUTOMATION NETWORK ARCHITECTURE," Inventors Shyam Kapadia, et al. The disclosure of the prior application is considered part of (and is incorporated by reference in) the disclosure of this application

TECHNICAL FIELD

This disclosure relates in general to the field of communications and, more particularly, to managing virtual network instance (VNI) to virtual local area network (VLAN) mapping conflicts for a dual-homed server.

BACKGROUND

The world today enjoys a wide variety of services provided over the network. These services range from browsing websites, streaming broadcast content, cloud storage of media, real-time communications, stock trading, big data computing, etc. These services are typically provided by computer systems and networking components in facilities called data centers. Data centers can house a high volume of computer systems (e.g., servers and virtual machines), and these computer systems are connected together via a variety of network devices (e.g., switches and routers). In recent years, data centers have grown in complexity, and the need to improve upon these data centers have also grown. Several design considerations for data centers include efficient use of resources, throughput/speed, mobility of servers and virtual machines, etc.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
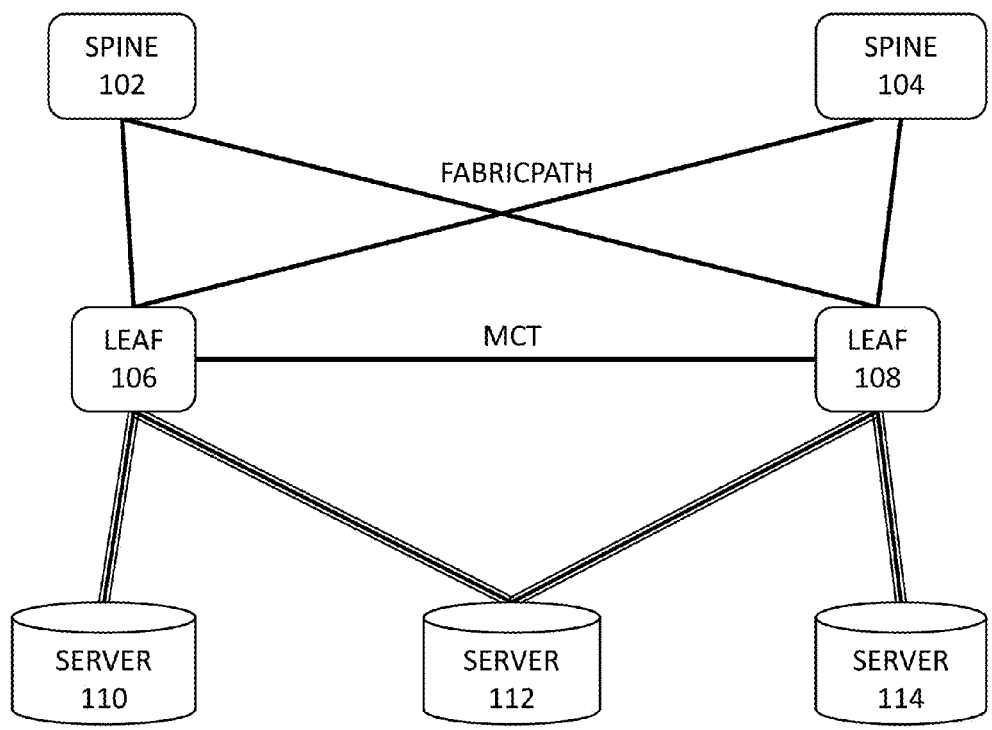
FIG. 1 is a system diagram illustrating an exemplary deployment of a multitenant architecture.

One or more embodiments may provide an apparatus, a computer readable non-transitory medium, and a method for managing virtual network instance (VNI) to virtual local area network (VLAN) mapping conflicts for a dual-homed server communicably connected to a first peer leaf and a second peer leaf over a virtual port channel (vPC). The method comprises: receiving, at the first peer leaf from the second peer leaf, information identifying a first VNI as being mapped to a second VLAN at the second peer leaf, wherein the first VNI is being mapped to a first VLAN at the first peer leaf, detecting that the first VLAN is different to the second VLAN, and in response to detecting the first VLAN is different from the second VLAN, blocking a link over the first VLAN connecting the first peer leaf to any virtual machine associated with the first VNI at the dual-homed server.

One or more embodiments may provide an apparatus, a computer readable non-transitory medium, and a method for managing virtual network instance (VNI) to virtual local area network (VLAN) mapping conflicts for a dual-homed server communicably connected to a first peer leaf over a first port and a second peer leaf over a second port. The method comprises: receiving, at the dual-homed server, information identifying a first VNI as being mapped to a first VLAN at the first peer leaf and the first VNI as being mapped to a second VLAN at the second peer leaf, transmitting, from the dual-homed server, a first frame over the first port to which the first peer leaf is connected using the first VLAN, when a second frame is to be transmitted to the second peer leaf, transmitting, from the dual-homed server, the second frame over the second port to which the second peer leaf is connected using the second VLAN.

Example Embodiments

Understanding Dynamic Fabric Automation (DFA) in Data Centers

Vinci, also known as Dynamic Fabric Automation (DFA), is a new architecture for data center (DC) networking. Its physical topology is based on a two-tier fat-tree, where each leaf switch connects to each spine switch and vice versa. In Vinci, FabricPath can be used to support data forwarding while Border Gateway Protocol (BGP) for end-host route distribution among leafs, via route reflector (RR). Servers can be connected to Vinci leafs, either through physical ports or virtual port channels (vPC). In the latter case, a multi-chassis trunk (MCT) link is established between two Vinci leafs serving as peers (virtual port channel (vPC) peers or virtual port channel plus (vPC+) peers).

Multitenancy Using Segmentation Identifiers (VNI) to Virtual Local Area Network (VLAN) Mappings Multitenancy is an important feature for Vinci. Within the context of this disclosure, multitenancy refers to the situation where virtual machines running on servers may serve a plurality of tenants (e.g., clients). One possible lightweight approach for multitenancy support may include a scheme, which includes the use of a segmentation identifier, which relates to a virtual local area network designation associated with a destination node. The scheme can include the following: (1) receive a packet that comprises information indicative of an internet protocol address and a segmentation identification/identifier, (2) select a virtual routing and forwarding table corresponding with the segmentation identification; (3) identify a destination node based, at least in part, on the internet protocol address and the virtual routing and forwarding table; and (4) transmit the packet to the destination node.

In an example of this scheme, a leaf switch, receiving node, and/or the like may receive a packet that comprises information indicative of an internet protocol address and segmentation identification. Similarly, a leaf switch, receiving node, and/or the like may receive a different packet that comprises information indicative of the internet protocol address and a different segmentation identification. In such an example, the packet and the different packet both designate a single internet protocol address but designate different segmentation identifications—thus providing multitenancy where one internet protocol address can serve two or more segmentation identifications (i.e., two or more tenants).

A segmentation identification may be viewed as a new attribute for a virtual local area network (VLAN). For example, in the case of a host facing port, a virtual port associated with a VLAN may be automatically associated with a segmentation identification, or a virtual network segment instance, that is tied to the VLAN. As a result, in some circumstances, such as in a multitenancy environment where there are multiple service instances spread across a plurality of network nodes, specifying an instance of a service on a port and virtual local area network basis can be avoided. In at least one example embodiment, the automatic association allows for the avoidance of implementation of additional complexities and constructs in a network environment such as, for example, introduction of bridge domains for virtual network segment instances.

In one instance, the scheme may include the segmentation identifier ("VN-segment ID"), also called virtual network instance (VNI), as the new attribute for virtual local area network (VLAN). For a host facing port, the virtual port (VP) associated with a VLAN automatically defines a VN-segment instance that ties to the VLAN. In other words, there is no need to specify a service instance on the <port, vlan> basis while existing VLAN infrastructure can be reused. In this scheme, an important issue is how to map VNIs to VLANs on a leaf switch. Typically, a virtual switch on a server can request a VLAN on the behalf of a virtual machine (VM) based on the VNI associated with the VM. This allows the use of network-based overlays where the overlay rightfully starts at the leaf/ToR as opposed to host-based overlays, which begin at the virtual-switch and have numerous disadvantages including hair-pinning etc. The request and subsequent response can be carried in the Virtual Station Interface (VSI) Discovery and Configuration Protocol (VDP), as specified in IEEE 802.1Qbg Clause 41.

FIG. 1 is a system diagram illustrating an exemplary deployment of a multitenant architecture. There can be two spine switches, spine 102, spine 104, and two leaf switches, leaf 106, leaf 108, in the fabric (interconnected by FABRICPATH). Server 110 and server 114 can be connected to leaf 106, leaf 108, respectively, through physical links, typically called singly-homed links, while server 112 is dual-homed to leaf 106 and leaf 108 through a virtual port channel. A multi-chassis trunk (MCT) link is established between leaf 106 and leaf 108 for the support of the virtual Port Channel (vPC). To facilitate VNI to VLAN mappings on leaf 106 and leaf 108, virtual switches on server 110, server 112, and server 114 run VDP to peer with leaf 106 or leaf 108.

Note that dual-homed servers, such as server 112 enjoy a variety of advantages leveraging vPC. A vPC allows links that are physically connected to two different leafs to appear as a single port channel to a third device (any other networking device). A vPC can provide Layer 2 multipathing, which allows a network administrator to create redundancy by increasing bandwidth, enabling multiple parallel paths between nodes and load-balancing traffic where alternative paths exist. vPC not only connects a server to different peer leafs, the peer leafs are also communicably connected to each other through vPC. vPC provides the following benefits: allows a single device to use a Port Channel across two upstream devices, eliminates Spanning Tree Protocol blocked ports, provides a loop-free topology, uses all available uplink bandwidth, provides fast convergence if either the link or a device fails, provides link-level resiliency, and helps ensure high availability.

If servers are connected to leafs through individual physical links (single-homed servers), the decision of how to map a VNI to a VLAN should be easy: just allocate a new VLAN reserved for the servers if the VNI does not have an existing mapping. This is feasible because the traffic of a server goes to one leaf only and the mapping in one leaf can be independent of another. However, there is a possibility that virtual port channels can be set up for dual-home servers after VNI to VLAN mappings were done independently in leafs before they can be turned into vPC peers. There can be discrepant VNI to VLAN mappings between the newly formed vPC peers, which will cause problem for traffic over vPC. The problem to be solved is how to cope with the discrepant VNI to VLAN mappings between virtual port channel peers.

Possible Approach: Synchronizing VNI to VLAN Mappings Between Peer Leafs

Figure 2:
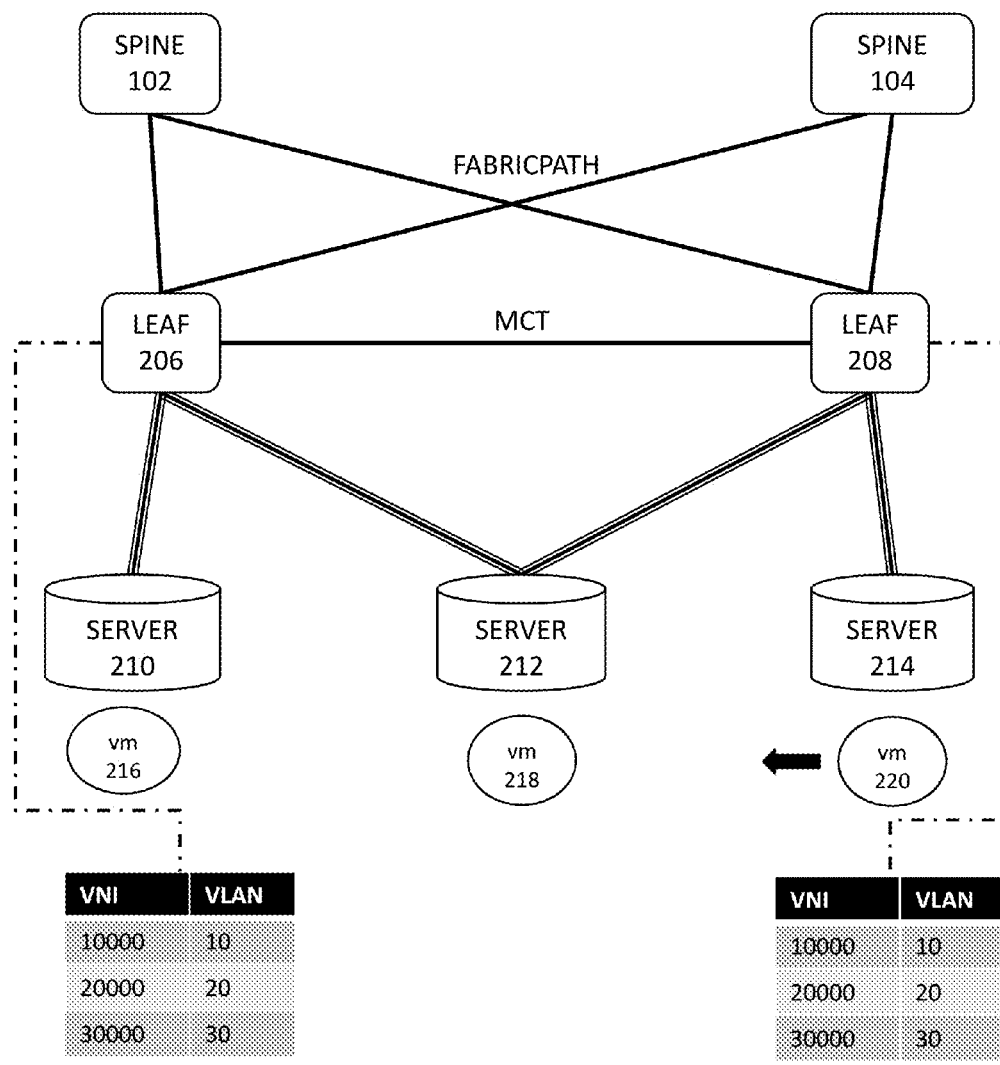
FIG. 2 is a system diagram illustrating synchronization of VNI to VLAN mappings between peer leafs.

One example approach for VNI to VLAN mapping over virtual port channels is to synchronize the mapping between virtual port channel peers. FIG. 2 is a system diagram illustrating synchronization of VNI to VLAN mappings between peer leafs. In FIG. 2, there are three virtual machines, vm 216, vm 218, and vm 220, which reside on server 210, server 212, and server 214, respectively. The virtual machines vm 216, vm 218, and vm 220 belong to virtual network instances (VNI) 10000, 20000, and 30000, respectively. If leaf 206 receives a request for VNI to VLAN mapping, it exchanges messages with leaf 208 to ensure that on both leafs, the VNI is mapped to the same VLAN. The synchronization is performed even if the request is from a server, which is not connected through a vPC. For example, in FIG. 2, vm 220 belongs to virtual network instance 30000 and connects to leaf 208 only. When a request is received on leaf 208 on behalf of vm 220, VNI 30000 can be mapped to VLAN 30 on both leaf 206 and leaf 208 after they exchange messages over the MCT link. Although the synchronization may not be needed if vm 220 stays at server 214, it is used if vm 220 moves to server 212, which is connected to both leaf 206 and leaf 208 via a virtual port channel.

Figure 3:
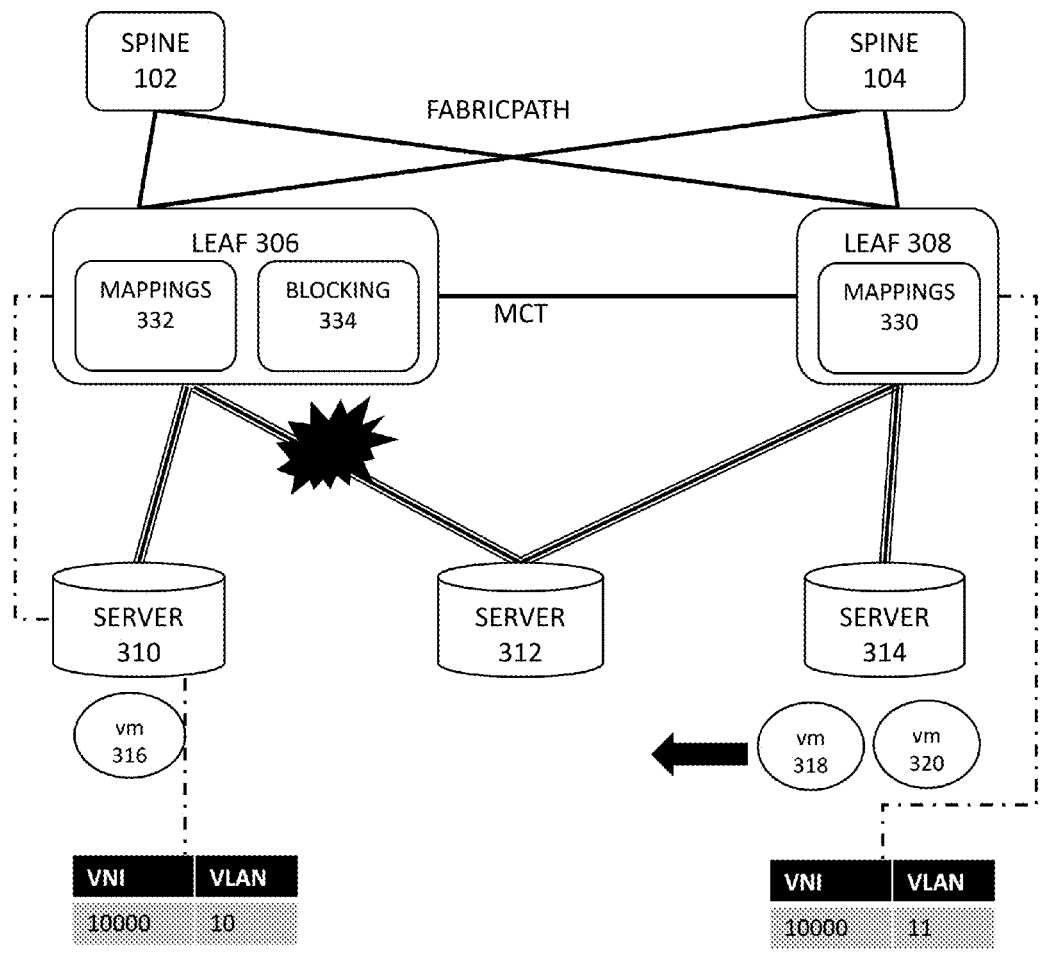
FIG. 3 is a system diagram illustrating VLAN blocking on a vPC member link, according to some embodiments of the disclosure.

This approach may stop working if mappings exist before a virtual port channel is set up between two leafs. Consider a scenario where multiple virtual machines belong to the same VNI, which is illustrated in FIG. 3. In FIG. 3, vm 316, vm 318 and vm 320 belong to the same virtual network instance 10000 and there was no virtual port channel between leaf 306 and leaf 308 in the beginning. Therefore, VNI 10000 was mapped to VLANs 10 and 11 (i.e., different VLANs) on leaf 306 and leaf 308, respectively, given there is no synchronization between leaf 306 and leaf 308. Now suppose a virtual port channel is established to connect server 312. If vm 318 moves from server 314 to server 312, an issue arises because leaf 306 and leaf 308 have different mapping for VNI 10000 but server 312 can send traffic to both leaf 306 and leaf 308 over the virtual port channel.

One Improved Approach: VLAN Blocking

As a remedy, one proposed mechanism is to block VLAN traffic over a vPC member link when mapping discrepancy is detected. FIG. 3 is a system diagram illustrating VLAN blocking on a vPC member link, according to some embodiments of the disclosure. For example, in FIG. 3, consider leaf 306 receives a VNI to VLAN mapping request from server 312 on behalf of vm 318 (which has moved from server 314). In the request, server 312 transmits a VNI and requests from leaf 306 a VLAN, which is mapped or can be mapped to the VNI in the request. It will detect the mapping discrepancy through message exchanges with leaf 308 over the MCT link, which informs leaf 306 that VNI 10000 is mapped to VLAN 11 (when VNI 10000 is mapped to VLAN 10 at leaf 306). In response to detecting the mapping discrepancy, leaf 306 can block VLAN 10 on its vPC member port connecting to server 312 (as indicated by the splash graphic on the link between leaf 306 server 312 and server and informs server 312 of mapping VNI 10000 to VLAN 11. Therefore, vm 318 traffic will reach leaf 308 only, encapsulated with VLAN 11.

Figure 4:
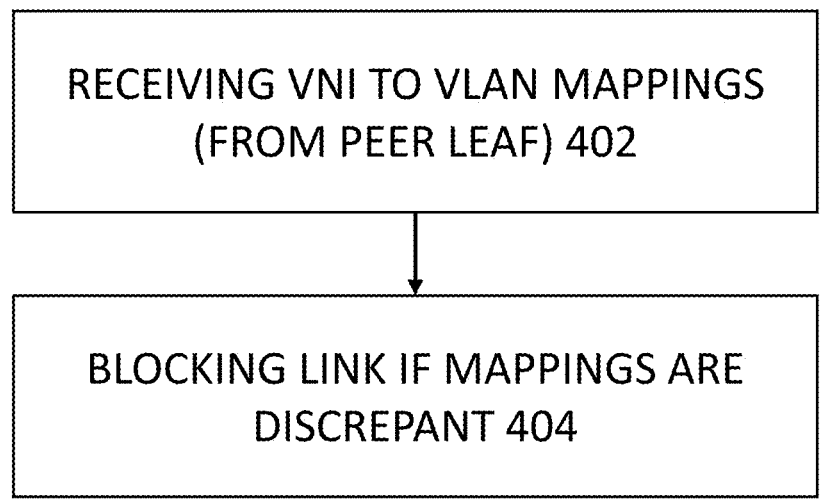
FIG. 4 is a flow diagram illustrating a method for managing VNI to VLAN mappings for a dual-homed server, according to some embodiments of the disclosure.

This approach ensures that conflicts in VNI to VLAN mappings do not cause any issues in the network, i.e., the vPC. FIG. 4 is a flow diagram illustrating a method for managing VNI to VLAN mappings for a dual-homed server, according to some embodiments of the disclosure. In one embodiment, a method for managing virtual network instance (VNI) to virtual local area network (VLAN) mapping conflicts can be implemented by a peer leaf using the blocking scheme shown in FIG. 3. Broadly, the scheme comprises receiving VNI to VLAN mappings from a peer leaf or another source, which manages the mappings (box 402). For instance, leaf 308 maintains VNI to VLAN mappings in mappings module 330, and the mappings are provided to leaf 306. The mappings module 330 can be a module, which runs VDP at leaf 306. Leaf 306 may include a mappings module 332 (running VDP) for maintaining VNI to VLAN mappings of leaf 306 and stores VNI to VLAN mappings of leaf 308. Using the (modified/improved) mappings module 332, leaf 306 can determine whether the VNI to VLAN mappings have discrepant entries. If the mapping are discrepant (different/conflicting) between peer leaf, a link is blocked to ensure consistency (box 404). For instance, leaf 306 can include a blocking module 334 to block the link.

In an example, the method can be used for managing conflicts associated with a dual-homed server (e.g., server 312) communicably connected to a first peer leaf (e.g., leaf 306) and a second peer leaf (e.g., leaf 308) over a virtual port channel (vPC). The method includes receiving, at the first peer leaf (e.g., in a mappings module 332, from the second peer leaf, or an entity running VDP configured to maintain VNI to VLAN mappings for peer leafs), information identifying a first VNI as being mapped to a second VLAN at the second peer leaf, wherein the first VNI is being mapped to a first VLAN at the first peer leaf. This could occur during exchange(s) of synchronization messages between the first peer leaf and the second peer leaf over the MCT link to allow the first peer leaf have knowledge of the VNI to VLAN mappings at the second peer leaf. In other words, the first peer leaf can receive the information over a multi-chassis trunk link established between the first peer leaf and the second peer leaf. This information sharing part of the method allows leaf 306 to have knowledge of other independently assigned VNI to VLAN mappings.

The method further includes detecting that the first VLAN is different from the second VLAN (e.g., using a mappings module 332 at leaf 306). This detection indicates discrepant VNI to VLAN mappings. The method also includes, in response to detecting the first VLAN is different from the second VLAN, blocking a link over the first VLAN connecting the first peer leaf to any virtual machine associated with the first VNI at the dual-homed server (e.g., using a blocking module 334).

In some cases, the method includes receiving, at the first peer leaf from the dual-homed server, a request for a (VNI to) VLAN mapping for a virtual machine associated with the first VNI (e.g., vm 318 of FIG. 3). This request can be a VDP request, and the request can be received by a mappings module (running VDP) at the first peer leaf. The detection of a conflict (and the subsequent blocking process) may only be performed, in some cases, in response to receiving this request for a VLAN mapping. For instance, the occurrence of the request and the VNI associated with the request can be provided from the module running VDP to the mappings module to invoke a process for determining whether discrepant mappings exist for the particular VNI.

In response to detecting the discrepancy in VNI to VLAN mapping, blocking a vPC link over the first VLAN connecting a virtual port at the first peer leaf to the virtual machine at dual-homed server to disallow traffic from the virtual machine to the first peer leaf using the first VLAN. In the example shown, the blocking, performed by blocking module 334, prevents vm 318 from using VLAN 10 and disallows traffic to travel from server 312 to leaf 306.

To respond to the request for mapping the virtual machine (e.g., vm 318), the first peer leaf (e.g., leaf 306) can utilize the information the first leaf had received with regards to the conflicting VNI to VLAN mapping at the second peer leaf (e.g., leaf 306) to inform the virtual switch at server 312 to use the proper VLAN. In this case, the method includes transmitting to the dual-homed server (e.g., server 312) a mapping of the first VNI to the second VLAN (e.g., VLAN 11) in response to the request. Such a response can be transmitted by a mappings module at the first peer leaf. In this manner, vm 318 would be informed to transmit data (to leaf 308) by encapsulating frames using VLAN 11 (i.e., the proper VLAN mapping for VNI 10000 on leaf 308).

Note that discrepant VNI to VLAN mappings typically would occur if leaf 306 and leaf 308 were not synchronized to have the same VNI to VLAN mappings. For instance, this situation arises when the virtual machine (e.g., vm 318) was previously on a single-homed server (e.g., server 314), and had been operating according to its independently assigned VNI to VLAN mapping. In some cases, the virtual machine was, prior to the first peer leaf receiving the request, associated with the first VNI at a server connected to the second peer leaf and not to the first peer leaf (e.g., server 314).

Managing various VNI to VLAN mappings to detecting whether the first VLAN is different from the second VLAN can include determining, at the first peer leaf, in a table mapping VNIs to VLANs, the first VLAN being mapped to the first VNI specified in the request for the VLAN mapping; and comparing second VLAN against the first VLAN being mapped to first VNI in the table. This may be performed by a mappings module.

Shortcomings of Synchronization and Blocking Approaches

Although the above schemes of vPC peer synchronization and VLAN blocking can be simple to implement, they can have the following limitations in some cases. Virtual port channel peer synchronization can lead to inefficient use of VLANs in peer switches. For example, in FIG. 2, even if vm 216 and vm 220 permanently stay at server 210 and server 214, respectively, they need to occupy VLANs on both leafs due to vPC peer synchronization. Ideally, vm 216 and vm 220's respective VNIs 10000 and 30000 should be mapped to the same VLAN 10 on leaf 206 and leaf 208 so that VLANs can be conserved. VLAN conservation is important as in the lightweight multitenant Vinci, the number of tenants supported is limited by available VLANs.

Although VLAN blocking ensures correctness in the case of VNI to VLAN mapping discrepancy, it may lead to traffic congestion, and reduced reliability as only one vPC member link is used to carry data traffic.

A Further Improved Approach: VDP and Virtual Switch Enhancements

Figure 5:
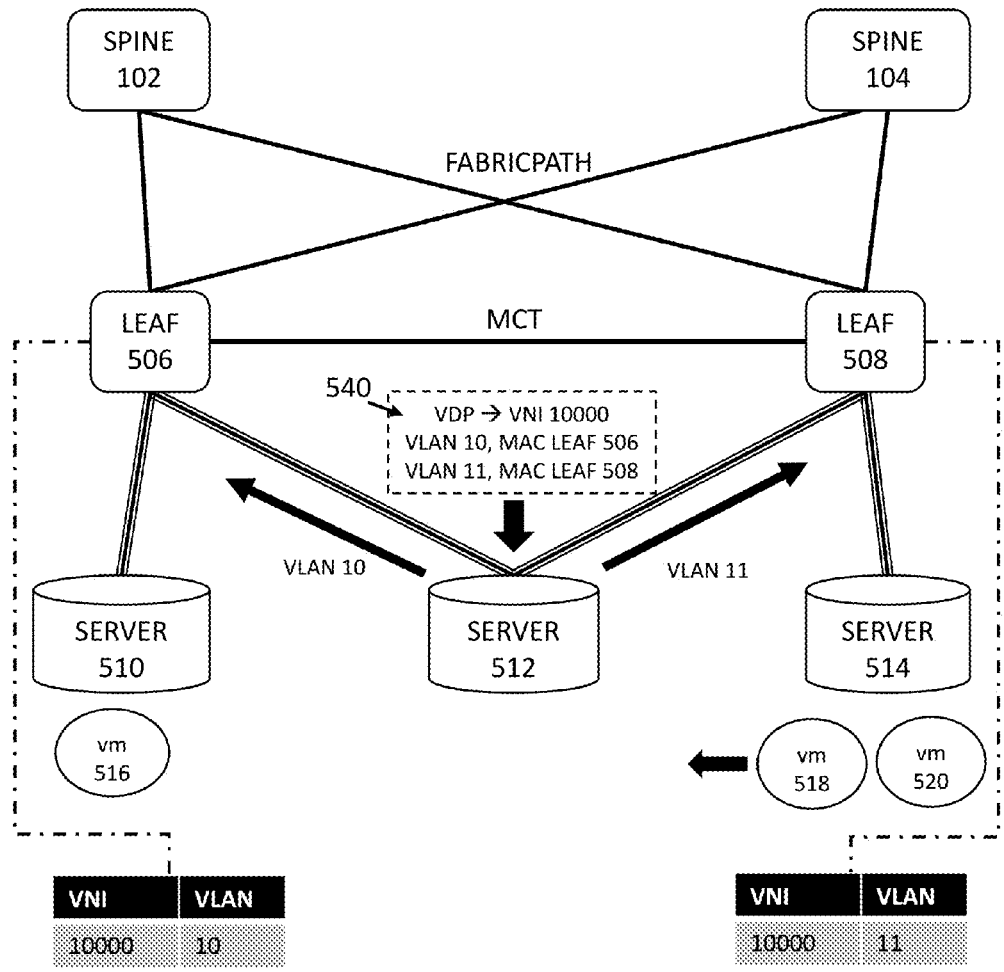
FIG. 5 is a system diagram illustrating VDP and virtual switch enhancements for discrepant VNI to VLAN mappings, according to some embodiments of the disclosure.

To overcome the above limitations, VDP and a virtual switch can be enhanced. FIG. 5 is a system diagram illustrating VDP and virtual switch enhancements for discrepant VNI to VLAN mappings, according to some embodiments of the disclosure. If a dual-homed server is connected to peer leafs through a virtual port channel, the server (i.e., a virtual switch) can use VDP to obtain different VNI to VLAN mappings at the peer leafs.

Figure 8:
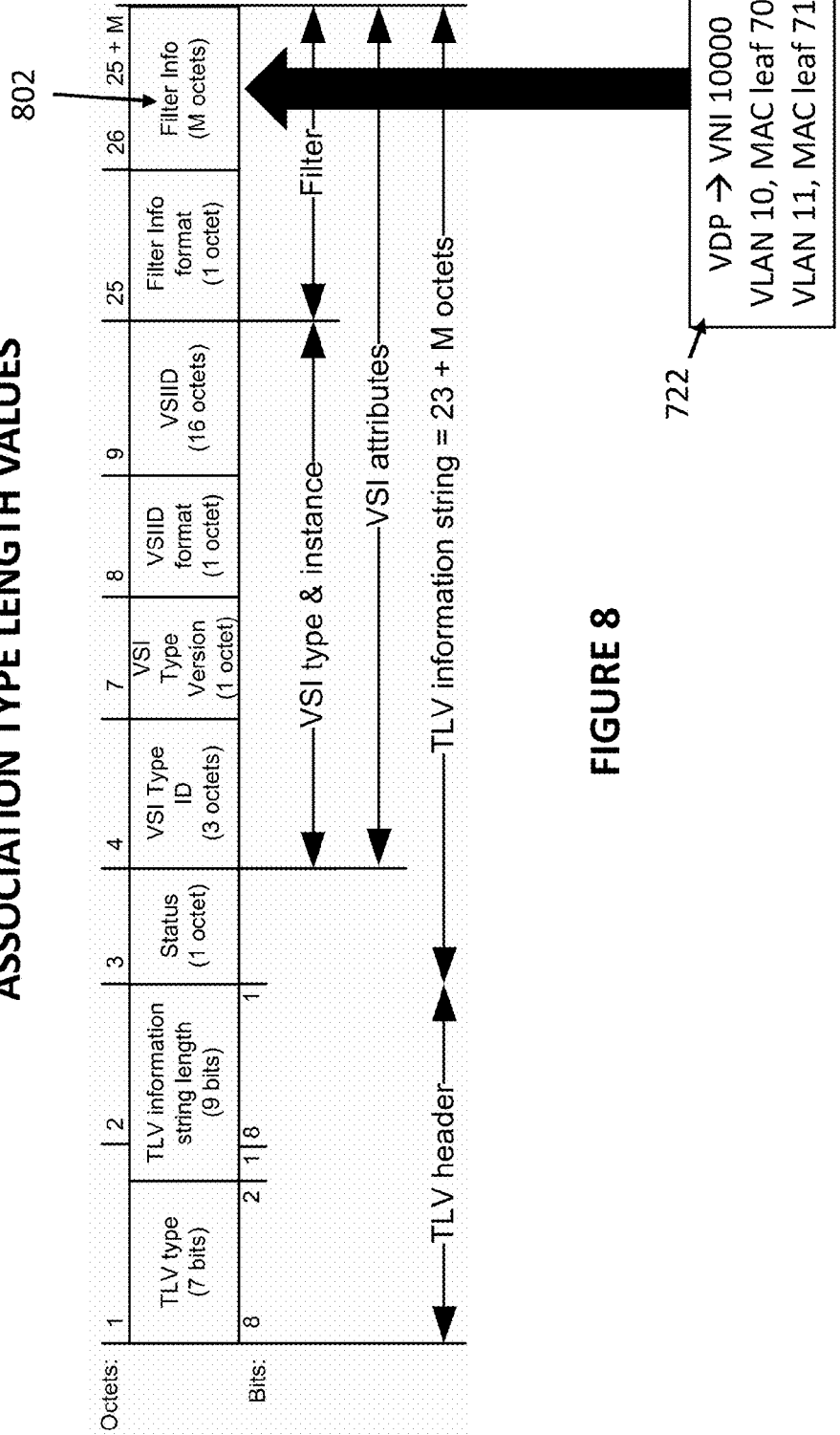
FIG. 8 shows an exemplary data format for VDP association TLV, according to some embodiments of the disclosure.
Figures 9, 10:
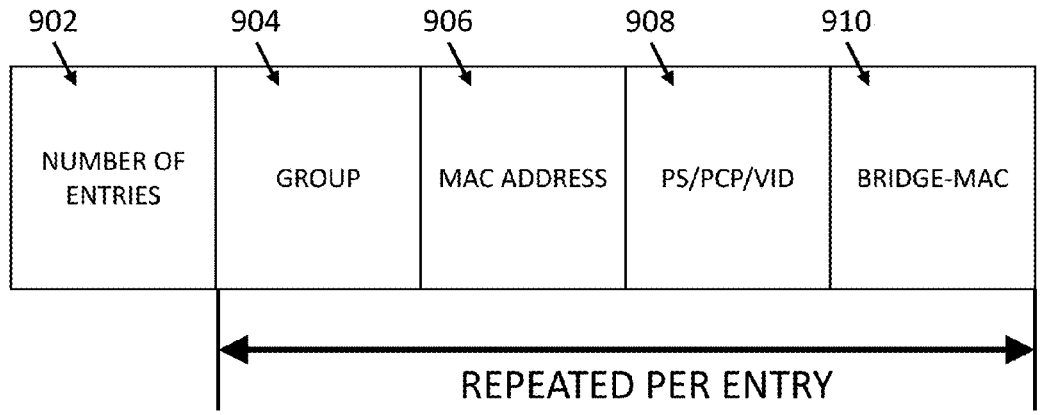
FIG. 9 shows an exemplary data format for a field, according to some embodiments of the disclosure.
FIG. 10 shows exemplary mapping entries for a field according to the data format shown in FIG. 9, according to some embodiments of the disclosure.

In one example, the framework proposed herein can extend VDP Filter Info Field, or some other suitable field for carrying the information, to carry a set of VLANs mapped to a VNI, keyed by leaf MAC addresses that serve as bridge identifiers (see exemplary information shown in box 540). Similar to FIG. 3, the system diagram shows three virtual machines, vm 516 (at server 510), vm 518 (initially at server 514), and vm 520 (at server 514). In the example of FIG. 5, if vm 518 moves to server 512. One of the peer leafs, say leaf 506, can notify the virtual switch of server 512 of VNI 10000 mapping to VLAN 10 and VLAN 11 for leaf 506 and leaf 508 (where leafs are identified by MAC addresses), respectively, e.g., through the new VDP Filter Info Field extension. The extension can be done similar to carrying IP address in VDP Filter Info Field, exemplary data structures for such purpose are shown in FIGS. 8-10.

Figure 7:
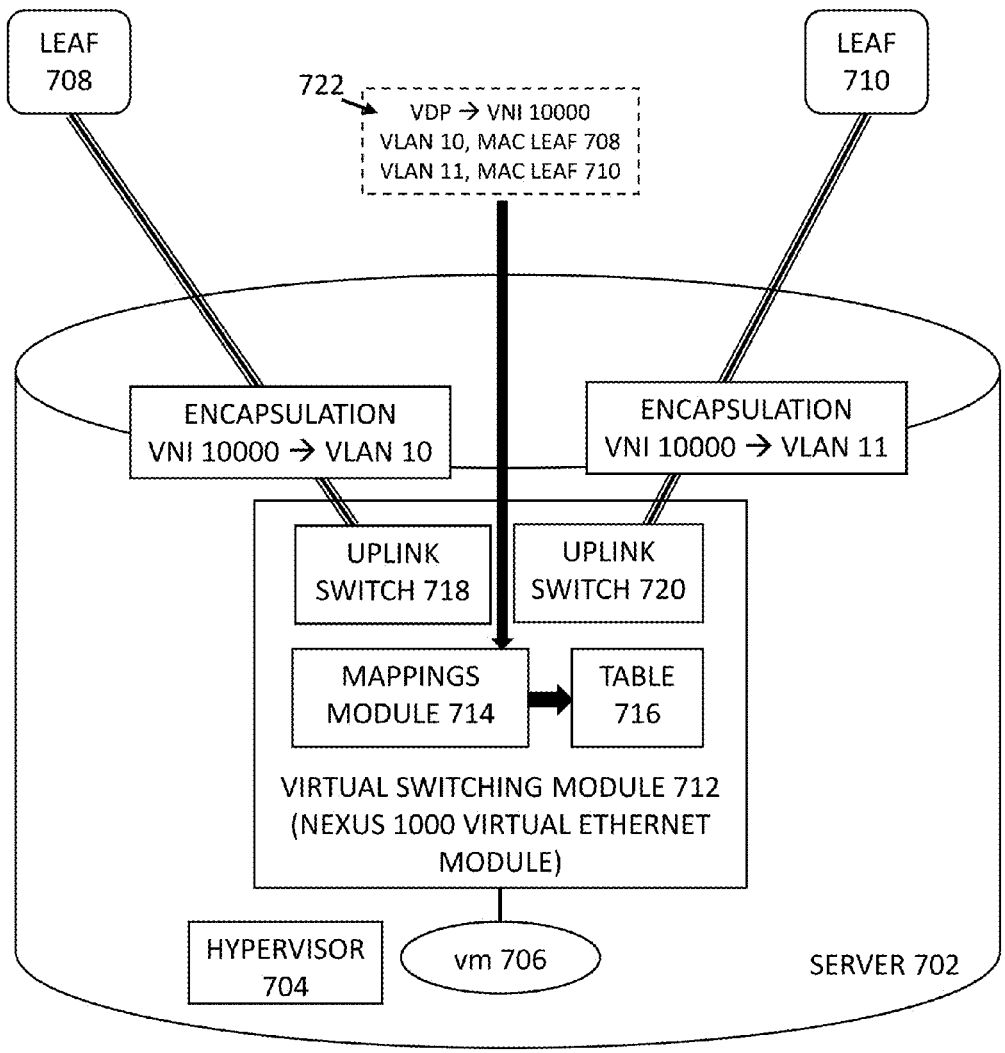
FIG. 7 is a system diagram illustrating a dual-homed server having an improved virtual switching module, according to some embodiments of the disclosure.

To process this information (the information shown in box 540) to manage the discrepant VNI to VLAN mappings, the virtual switch on server 512 (details of such virtual switch is shown in further detail in FIG. 7) is modified to perform encapsulation with respective VLANs over vPC member links. Through a discovery protocol (e.g., Cisco Discovery Protocol (CDP)) running over vPC member ports, the virtual switch can gather information on how member ports are connected to leafs (typically all the ports connected to the same leaf are bundled together into a sub-group as is done in a virtual switch such as the Cisco Nexus 1000V (N1KV)). In other words, the virtual switch knows which member port is connected to which peer leaf (as identified by the leaf's media access control (MAC) address).

When the virtual switch encapsulates a frame to be sent over a member port, it will use the VLAN associated with the leaf to which the member port is connected. The virtual switch, based on the information carried in the extended VDP response, can maintain a table for mapping VNIs to the corresponding VLANs on a per uplink switch basis (which is illustrated in detail in FIG. 7). For example, in FIG. 5, the virtual switch on server 512 learns that the vPC member ports on the left and right sides can be connected to leaf 506 and leaf 508, respectively, through a discovery protocol. The virtual switch also learns VNI 10000 is mapped to VLAN 10 and VLAN 11 for leaf 506 and leaf 508, respectively, through the modified/improved VDP extension. Then when the virtual switch sends a frame over the vPC member port on the left side, it will use VLAN 10 for encapsulation. Similarly, when it sends a frame over the vPC member port on the right side, it will use VLAN 11 for encapsulation.

Figure 6:
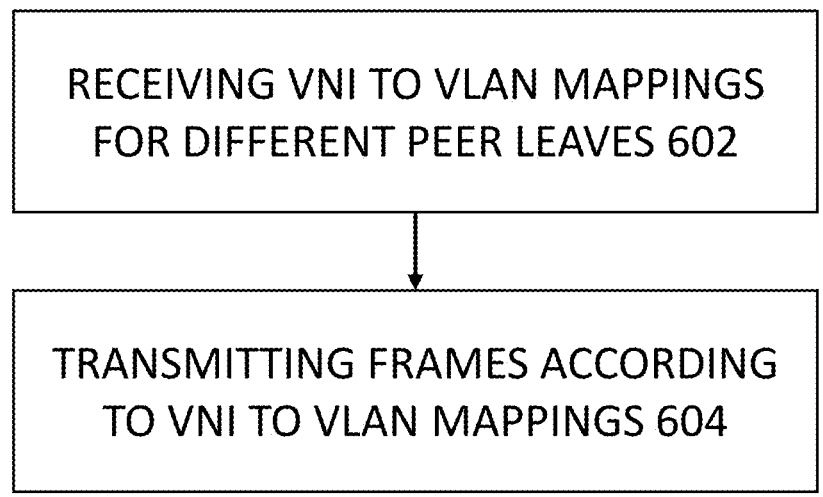
FIG. 6 is a flow diagram illustrating another method for managing VNI to VLAN mappings for a dual-homed server, according to some embodiments of the disclosure.

FIG. 6 is a flow diagram illustrating another method for managing VNI to VLAN mappings for a dual-homed server, according to some embodiments of the disclosure. Broadly, the VDP extension and virtual switch modification can be summarized by the following. A virtual switching module at a server receives or gathers VNI to VLAN mappings for different peer leafs (box 602), e.g., through a VDP extension and stores the information in a table. Equipped with this information, the improved virtual switching module transmits frames according to the VNI to VLAN mappings (box 604) per uplink switch basis (i.e., based on which leaf the frame is being targeted). The resulting system does not require VNI to VLAN mappings to be consistent nor synchronized between peer leafs.

The method shown in FIG. 6 can be used for managing virtual network instance (VNI) to virtual local area network (VLAN) mapping conflicts for a dual-homed server communicably connected to a first peer leaf over a first port and a second peer leaf over a second port. Such a method for managing VNI to VLAN mappings can be implemented in an improved server, e.g., having an improved virtual switching module. FIG. 7 is a system diagram illustrating the dual-homed server having an improved virtual switching module, according to some embodiments of the disclosure. Server 702, equipped with a hypervisor 704, can have a virtual machine 706. Virtual machine 706 may have been migrated from another server, and virtual machine 706 is associated with VNI 10000 in this example. Server 702 is a dual-homed server connected via vPC to a first peer leaf 708 and a second peer leaf 710. Similar to the scenario described in relation to FIG. 5, VNI 10000 is mapped to VLAN 10 at leaf 708, and the same VNI is mapped to VLAN 11 at leaf 710.

The method includes receiving, at the dual-homed server (e.g., server 702), information identifying a first VNI as being mapped to a first VLAN at the first peer leaf and the first VNI as being mapped to a second VLAN at the second peer leaf. In this example, server 702 receives information 722 having a set of VLANs mapped to a VNI, keyed by leaf MAC addresses that serve as bridge identifiers. Server 702 includes a virtual switching module 712 for obtaining such information. In particular, the information 722 may be obtained by a mappings module 714 and stored in a table 716 (or any suitable storage element). An example of the virtual switching module 712 includes the Cisco Nexus 1000 virtual Ethernet module).

Leveraging information 722, the dual-homed server can transmit a first frame over the first port to which the first peer leaf is connected using the first VLAN. In this example, server 702, specifically, the virtual switching module 712, can transmit the first frame over a first port to leaf 708 using VLAN 10. When a second frame is to be transmitted to the second peer leaf, the dual-homed server can transmit the second frame over the second port to which the second peer leaf is connected using the second VLAN. In this example, server 702, specifically, the virtual switching module 712 can transmit the second frame to leaf 710 over the second port using VLAN 11. The resulting virtual switching module can advantageously differentiate traffic being sent to peer leaf 708 and peer leaf 710 and transmit frames according to the VNI to VLAN mappings at peer leaf 708 and peer leaf 710. When virtual switching module 712 transmits the first frame, the virtual switching module 712 encapsulates the first frame using the first VLAN; when virtual switching module 712 transmits the second frame, the virtual switching module 712 encapsulates the second frame using the second VLAN.

The information 722 includes VNI to VLAN mapping entries at the peer leafs. In particular, information 722 further includes (1) a first mapping of the first VLAN and a first media access control (MAC) address of the first peer leaf, and (2) a second mapping of the second VLAN and a second MAC address of the second peer leaf. In this example, the information 722 indicates VNI 10000 is mapped to VLAN 10 for leaf 708 (as specified by the mac address of leaf 708), and the information indicates that VNI 10000 is mapped to VLAN 11 for leaf 710 (as specified by the mac address of leaf 710).

Besides knowing the VNI to VLAN mappings (information 722), the virtual switching module 712 is configured to discover which leaf is at which port such that frames can be transmitted according to the appropriate VLAN for a particular port. For instance, using a discovery protocol such as the Cisco Discovery Protocol, the virtual switching module 712 at the dual-homed server can associate, the first peer leaf (as identified by the leaf's MAC address) with the first port and the second peer leaf (as identified by the leaf's MAC address) with the second port. The discovery protocol can allow the virtual switching module to associate a particular leaf (identified/specified by the leaf's media access control (MAC) address) to a particular uplink switch (having the corresponding port). Knowing which port goes to which peer leaf and knowing the VNI to VLAN mappings for each peer leaf, the virtual uplink switches can be configured to transmit frames using the proper VLAN.

Having discovered which leaf is at which port, uplink switches at virtual switching module 712 are configured to transmit according to the appropriate VLANs. A mappings module 714 enables the proper configuration of uplink switches by maintaining a table 716 for mapping (1) the first VNI to a first VLAN for a first uplink switch having the first port and (2) the first VNI to a second VLAN for a second uplink switch having the second port. In other words, the mappings module 714, as a result, can maintain a table for mapping VNIs to the corresponding VLANs on a per uplink switch basis. In this example, uplink switch 718 can encapsulate the first frame using the first VLAN and uplink switch 720 can encapsulate the second frame using the second VLAN.

Enhanced VDP: An Exemplary Data Format

The server 702 (e.g., the mappings module 714) receives the information 722 through an enhancement to Virtual Station Interface (VSI) Discovery and Configuration Protocol (VDP) (a protocol specified in IEEE 802.1Qbg Clause 41). Specifically, the information 722 can be transported in an information field of a VDP response. The VDP response can be transmitted from a bridge running the VDP protocol. Generally speaking, VDP can used to signal the presence of end-hosts (virtual machines, or VMs) and exchange capability as well as enabling the association/de-association of the VMs with its network state. Typically, VDP allows VMs to announce to other network elements of its existence to allow traffic to be routed to and from the virtual machine appropriately. Running VDP, leafs would interact with virtual switching modules or mappings modules to discover and associate virtual machines on a server. Virtual Station Interface (VSI) is an internal point-to-point Ethernet LAN that connects a virtual machine (VM) to a port of a virtual switch. To facilitate the consistent migration of VM and its network state, the VDP protocol is specified to enable the association of a VSI Type with a VSI instance and the de-association of a VSI Type with a VSI instance. This further enables the movement of the VSI Type when the VSI Instance moves, i.e. by a sequence of association and de-association operations. VDP also can be used to automate the configuration of network state and the association of the network state to a VSI Instance, and supports profiling for each VM.

One message of interest in this disclosure is the VDP association Type Length Value message, which is typically used to transport information associated with network state for a virtual machine. FIG. 8 shows an exemplary data format for VDP association TLV, according to some embodiments of the disclosure. A bridge running VDP can transmit this information to a server (specifically, a virtual switching module) to inform the server of network state information associated with VSI instance, or a virtual machine. Following the example shown in FIG. 7, the information 722 having a set of VLANs mapped to a VNI, keyed by leaf MAC addresses that serve as bridge identifiers can be transported in a VDP Filter Info Field 802 of the VDP association TLV message.

The extension to VDP association TLV message is merely an example extension, which can be made to VDP to carry such information to allow the server to be informed of the VNI to VLAN mappings at various peer leaf. Other extensions can be applied in other messages as long as the message has sufficient capacity to carry the information (e.g., enough octets allocated), and as long as the message is transmitted from a bridge running VDP to a server having VMs.

FIG. 9 shows an exemplary data format for a field (the filter info field), according to some embodiments of the disclosure. In this example, the field comprises information indicating a number of mapping entries mapping VNIs to VLANs (NUMBER OF ENTRIES 902), and for each mapping entry, the field includes: information indicating a particular VNI (GROUP 904); media access control (MAC) address information indicating a MAC address of a particular leaf (MAC ADDRESS 906); VLAN information indicating a VLAN to which the particular VNI is mapped at the particular leaf (PS/PCP/VID 908); and MAC address information indicating a MAC address of the bridge running the VDP protocol (BRIDGE-MAC 910).

FIG. 10 shows exemplary content for the filter info field having mapping entries according to the data format shown in FIG. 9, according to some embodiments of the disclosure. Specifically, the example illustrates content for the filter info field, which follows the exemplary information 722 from FIG. 7. The content has two entries, for specifying VNI to VLAN mappings at two different peer leafs, i.e., leaf 708 and leaf 710. One mapping entry specifies that VNI 10000 at leaf 708 (as identified by the MAC address of leaf 708) is mapped to VLAN 10, and further includes the MAC address of the bridge running VDP; the other mapping entry specifies that VNI 10000 at leaf 710 (as identified by the MAC address of leaf 710) is mapped to VLAN 11, and further includes the MAC address of the bridge running VDP.

Variations and Implementations

Within the context of the disclosure, a network used herein represents a series of points, nodes, or network elements of interconnected communication paths for receiving and transmitting packets of information that propagate through a communication system. A network offers communicative interface between sources, servers, leaf, spines, and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtual), peer leafs, leafs, spines, end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the management of virtual network instance (VNI) to virtual local area network (VLAN) mapping conflicts operations thereof. This may be inclusive of appropriate algorithms and communication protocols that allow for the effective exchange of data or information.

In one implementation, leaf and servers described herein may include software to achieve (or to foster) the functions discussed herein for managing VNI to VLAN mapping conflicts where the software is executed on one or more processors to carry out the functions. This could include the implementation of instances of mappings modules, blocking module, virtual switching modules, and/or any other suitable element seen in FIGS. 5 and 7 that would foster the activities discussed herein. Additionally, each of these elements can have an internal structure (e.g., a processor, a memory element, etc.) to facilitate some of the operations described herein. In other embodiments, these functions for managing VNI to VLAN mapping conflicts may be executed externally to these elements, or included in some other network element to achieve the intended functionality. Alternatively, each of these elements may include software (or reciprocating software) that can coordinate with other network elements in order to achieve the managing VNI to VLAN mapping conflicts functions described herein. In still other embodiments, one or several devices may include any suitable algorithms, hardware, software, components, modules, interfaces, or objects that facilitate the operations thereof.

In certain example implementations, the managing VNI to VLAN mapping conflicts functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as tables of mappings disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, servers, leaf, etc.) can include memory elements for storing information (e.g., for storing mapping entries in a table) to be used in achieving managing VNI to VLAN mapping conflicts, as outlined herein. Additionally, each of these devices may include a processor that can execute software or an algorithm to perform the managing VNI to VLAN mapping conflicts activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of managing VNI to VLAN mapping conflicts, as potentially applied to a myriad of other architectures.

It is also important to note that the steps in the FIGS. 4 and 6 illustrate only some of the possible scenarios that may be executed by, or within, the leaf and/or servers described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by leaf and/or servers in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for managing virtual network instance (VNI) to virtual local area network (VLAN) mapping conflicts for a dual-homed server communicably connected to a first peer leaf over a first port and a second peer leaf over a second port, the method comprising:
   receiving, at the dual-homed server, information identifying a first VNI as being mapped to a first VLAN at the first peer leaf and the first VNI as being mapped to a second VLAN at the second peer leaf, wherein the information is transported in an information field of a virtual station interface (VSI) discovery and configuration protocol (VDP) response from a bridge running the VDP protocol;
   transmitting, from the dual-homed server, a first frame over the first port to which the first peer leaf is connected using the first VLAN;
   when a second frame is to be transmitted to the second peer leaf, transmitting, from the dual-homed server, the second frame over the second port to which the second peer leaf is connected using the second VLAN.

2. The method of claim 1, wherein transmitting the first frame comprises encapsulating the first frame using the first VLAN, and transmitting the second frame comprises encapsulating the second frame using the second VLAN.

3. The method of claim 1, further comprising:
   associating, at the dual-homed server via a discovery protocol, the first peer leaf with the first port and the second peer leaf with the second port.

4. The method of claim 1, further comprising:
   maintaining a table for mapping (1) the first VNI to a first VLAN for a first uplink switch having the first port and (2) the first VNI to a second VLAN for a second uplink switch having the second port.

5. The method of claim 1, wherein the information comprises, for the first VNI:
   (1) a first mapping of the first VLAN and a first media access control (MAC) address of the first peer leaf; and
   (2) a second mapping of the second VLAN and a second MAC address of the second peer leaf.

6. The method of claim 1, wherein the field comprises information indicating a number of mapping entries mapping VNIs to VLANs, and for each mapping entry, the field includes:
   (1) information indicating a particular VNI;
   (2) media access control (MAC) address information indicating a MAC address of a particular leaf;
   (3) VLAN information indicating a VLAN to which the particular VNI is mapped at the particular leaf; and
   (4) MAC address information indicating a MAC address of the bridge running the VDP protocol.

7. A dual-homed server for managing virtual network instance (VNI) to virtual local area network (VLAN) mapping conflicts, the dual-homed server communicably connected to a first peer leaf over a first port and a second peer leaf over a second port, the dual-homed server comprising:
   at least one memory element;
   at least one processor coupled to the at least one memory element; and
   a virtual switching module that when executed by the at least one processor is configured to:
      receive, at the dual-homed server, information identifying a first VNI as being mapped to a first VLAN at the first peer leaf and the first VNI as being mapped to a second VLAN at the second peer leaf, wherein the information is transported in an information field of a virtual station interface (VSI) discovery and configuration protocol (VDP) response from a bridge running the VDP protocol;
      transmit, from the dual-homed server, a first frame over the first port to which the first peer leaf is connected using the first VLAN;
      when a second frame is to be transmitted to the second peer leaf, transmit, from the dual-homed server, the second frame over the second port to which the second peer leaf is connected using the second VLAN.

8. The dual-homed server of claim 7, wherein transmitting the first frame comprises encapsulating the first frame using the first VLAN, and transmitting the second frame comprises encapsulating the second frame using the second VLAN.

9. The dual-homed server of claim 7, wherein the virtual switching module that when executed by the at least one processor is further configured to:
   associate, at the dual-homed server via a discovery protocol, the first peer leaf with the first port and the second peer leaf with the second port.

10. The dual-homed server of claim 7, wherein the virtual switching module that when executed by the at least one processor is further configured to:
    maintain a table for mapping (1) the first VNI to a first VLAN for a first uplink switch having the first port and (2) the first VNI to a second VLAN for a second uplink switch having the second port.

11. The dual-homed server of claim 7, wherein the information comprises, for the first VNI:
    (1) a first mapping of the first VLAN and a first media access control (MAC) address of the first peer leaf; and
    (2) a second mapping of the second VLAN and a second MAC address of the second peer leaf.

12. The dual-homed server of claim 7, wherein the field comprises information indicating a number of mapping entries mapping VNIs to VLANs, and for each mapping entry, the field includes:
    (1) information indicating a particular VNI;
    (2) media access control (MAC) address information indicating a MAC address of a particular leaf;
    (3) VLAN information indicating a VLAN to which the particular VNI is mapped at the particular leaf; and
    (4) MAC address information indicating a MAC address of the bridge running the VDP protocol.

13. A computer readable non-transitory medium comprising one or more instructions, for managing virtual network instance (VNI) to virtual local area network (VLAN) mapping conflicts for a dual-homed server communicably connected to a first peer leaf and a second peer leaf over a virtual port channel (vPC), that when executed on a processor configure the processor to perform operations comprising:
    receiving, at the dual-homed server, information identifying a first VNI as being mapped to a first VLAN at the first peer leaf and the first VNI as being mapped to a second VLAN at the second peer leaf, wherein the information is transported in an information field of a virtual station interface (VSI) discovery and configuration protocol (VDP) response from a bridge running the VDP protocol:
    transmitting, from the dual-homed server, a first frame over the first port to which the first peer leaf is connected using the first VLAN;
    when a second frame is to be transmitted to the second peer leaf, transmitting, from the dual-homed server, the second frame over the second port to which the second peer leaf is connected using the second VLAN.

14. The computer readable non-transitory medium of claim 13, wherein transmitting the first frame comprises encapsulating the first frame using the first VLAN, and transmitting the second frame comprises encapsulating the second frame using the second VLAN.

15. The computer readable non-transitory medium of claim 13, further comprising:
    associating, at the dual-homed server via a discovery protocol, the first peer leaf with the first port and the second peer leaf with the second port.

16. The computer readable non-transitory medium of claim 13, wherein the information comprises, for the first VNI:
    (1) a first mapping of the first VLAN and a first media access control (MAC) address of the first peer leaf; and
    (2) a second mapping of the second VLAN and a second MAC address of the second peer leaf.

17. The computer readable non-transitory medium of claim 13, wherein the field comprises information indicating a number of mapping entries mapping VNIs to VLANs, and for each mapping entry, the field includes:
    (1) information indicating a particular VNI;
    (2) media access control (MAC) address information indicating a MAC address of a particular leaf;
    (3) VLAN information indicating a VLAN to which the particular VNI is mapped at the particular leaf; and
    (4) MAC address information indicating a MAC address of the bridge running the VDP protocol.

18. The computer readable non-transitory medium of claim 13, further comprising:
    maintaining a table for mapping (1) the first VNI to a first VLAN for a first uplink switch having the first port and (2) the first VNI to a second VLAN for a second uplink switch having the second port.

* * * * *